(12) United States Patent
Gieras et al.

(10) Patent No.: US 9,350,225 B2
(45) Date of Patent: May 24, 2016

(54) INTEGRATED ELECTROMAGNETIC CLUTCH AND EDDY-CURRENT COUPLING

(71) Applicant: Hamilton Sundstrand Corporation, Charlotte, NC (US)

(72) Inventors: Jacek F. Gieras, Glastonbury, CT (US); Gregory I. Rozman, Rockford, IL (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 290 days.

(21) Appl. No.: 13/911,535

(22) Filed: Jun. 6, 2013

(65) Prior Publication Data

US 2014/0361652 A1 Dec. 11, 2014

(51) Int. Cl.
*H02K 49/04* (2006.01)
*F16D 27/08* (2006.01)
*F16D 47/02* (2006.01)

(52) U.S. Cl.
CPC .............. *H02K 49/043* (2013.01); *F16D 27/08* (2013.01); *F16D 47/02* (2013.01); *F16D 2300/26* (2013.01)

(58) Field of Classification Search
CPC .... H02K 49/043; F16D 2300/26; F16D 27/08
USPC ............................................ 310/78, 100, 103
See application file for complete search history.

(56) References Cited

U.S. PATENT DOCUMENTS

| | | | |
|---|---|---|---|
| 1,963,638 A | | 6/1934 | Wilsing |
| 3,240,969 A | | 3/1966 | Jaeschke |
| 5,140,206 A | * | 8/1992 | Hasegawa et al. ............ 310/78 |
| 5,773,904 A | * | 6/1998 | Schiebold et al. ............ 310/92 |
| 6,468,163 B1 | * | 10/2002 | Boffelli et al. ................. 464/29 |
| 8,267,236 B2 | | 9/2012 | Yoshida et al. |

FOREIGN PATENT DOCUMENTS

| | | |
|---|---|---|
| DE | 1020242 B | 11/1957 |
| EP | 1092581 A2 | 4/2001 |
| EP | 2815981 A1 | 12/2014 |
| FR | 2492487 A1 | 4/1982 |

OTHER PUBLICATIONS

Extended European Search Report Application No. 14171015.2-1655/2818747 dated Mar. 10, 2016.

* cited by examiner

*Primary Examiner* — Hanh Nguyen
(74) *Attorney, Agent, or Firm* — Locke Lord LLP; Scott D. Wofsy; Joshua L. Jones

(57) ABSTRACT

A system for transmission of power includes a clutch having a driven clutch member and a driving clutch member. The driven and driving clutch members are operatively connected to one another for common rotation in a first position with the clutch members engaged to one another and for rotation relative to one another in a second position with the clutch members disengaged from one another. An eddy-current coupling is operatively connected to selectively move at least one of the clutch members to engage and disengage the clutch members between the first and second positions. The eddy-current coupling is also operatively connected to provide electromagnetic eddy-current coupling between the clutch members with the clutch members in the second position disengaged from one another to drive the driven clutch member at a rate different from that of the driving clutch member.

14 Claims, 3 Drawing Sheets

INTEGRATED ELECTROMAGNETIC CLUTCH AND EDDY-CURRENT COUPLING

BACKGROUND OF THE INVENTION

1. Field of the Invention

The present invention relates to transmission of mechanical power, and more particularly to clutches.

2. Description of Related Art

A variety of devices are known for transmitting mechanical power from a power source, such as an engine or motor, to a driven component such as the wheels of a vehicle. For example, a traditional ground vehicle has an engine or motor, wherein power from the engines is communicated to the wheels by way of a transmission and clutch. The clutch engages and disengages the motor from the transmission as needed to start the vehicle moving from a stopped position, or to shift gears in the transmission.

Such conventional methods and systems have generally been considered satisfactory for their intended purpose. However, there is still a need in the art for systems and methods that allow for improved transmission of mechanical power, for example to allow for flexibility to respond to torque requirements due to changes in traction. There also remains a need in the art for such systems and methods that are easy to make and use. The present invention provides a solution for these problems.

SUMMARY OF THE INVENTION

A new and useful system for transmission of power from a driving member to a driven member includes a clutch having a driven clutch member and a driving clutch member. The driven and driving clutch members are operatively connected to one another for common rotation in a first position with the clutch members engaged to one another and for rotation relative to one another in a second position with the clutch members disengaged from one another. An eddy-current coupling is operatively connected to selectively move at least one of the clutch members to engage and disengage the clutch members between the first and second positions. The eddy-current coupling is also operatively connected to provide electromagnetic eddy-current coupling between the clutch members with the clutch members in the second position disengaged from one another to drive the driven clutch member at a rate different from that of the driving clutch member.

In certain embodiments, the system includes a housing with spaced apart bearings supporting an input shaft and a separate output shaft, wherein the input shaft is configured and adapted to be connected to a motor or engine for mechanical power input, and wherein the output shaft is configured and adapted to be connected to deliver mechanical rotational power output. The driving clutch member can be configured and adapted to rotate in common with the input shaft, and a clutch spring can be operatively connected to bias the driving clutch member toward the first position engaged with the driven clutch member. The driven clutch member can be configured and adapted to rotate in common with the output shaft.

In accordance with certain embodiments, the clutch is an electromagnetic clutch. The driving clutch member can be operatively connected to an electromagnetic actuator for movement between the first and second positions. The electromagnetic actuator can include a synchronous generator operatively connected to selectively generate an electromagnetic field to move the driving clutch member into the second position, disengaged from the driven clutch member. The system can include an input shaft with the driving clutch member and a rotating armature of the synchronous generator operatively connected for common rotation with the input shaft. A field coil can be operatively connected for rotation in common with the input shaft. The synchronous generator can include a stationary DC winding configured and adapted to remain stationary relative to the rotating armature of the synchronous generator, and to deliver field excitation current to the field coil of the electromagnetic clutch through the rotating armature to generate a magnetic field from the field coil to move the driving clutch member into the second position, disengaged from the driven clutch member. The system can also include a rotating rectifier operatively connected to the rotating armature for delivering DC field excitation from the rotating armature to the field coil of the electromagnetic clutch.

In certain embodiments, the eddy-current coupling is operatively connected to drive the driven clutch member at a rate different from that of the driving clutch member with the driving clutch member in the second position. The system can include a drum mounted to the driven clutch member for common rotation with the output shaft. The drum can be radially spaced apart outward from a field coil operatively connected for common rotation with the input shaft. An electric circuit can be mounted within the drum, wherein the electric circuit of the drum and the field coil are operatively connected for eddy-current coupling therebetween.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
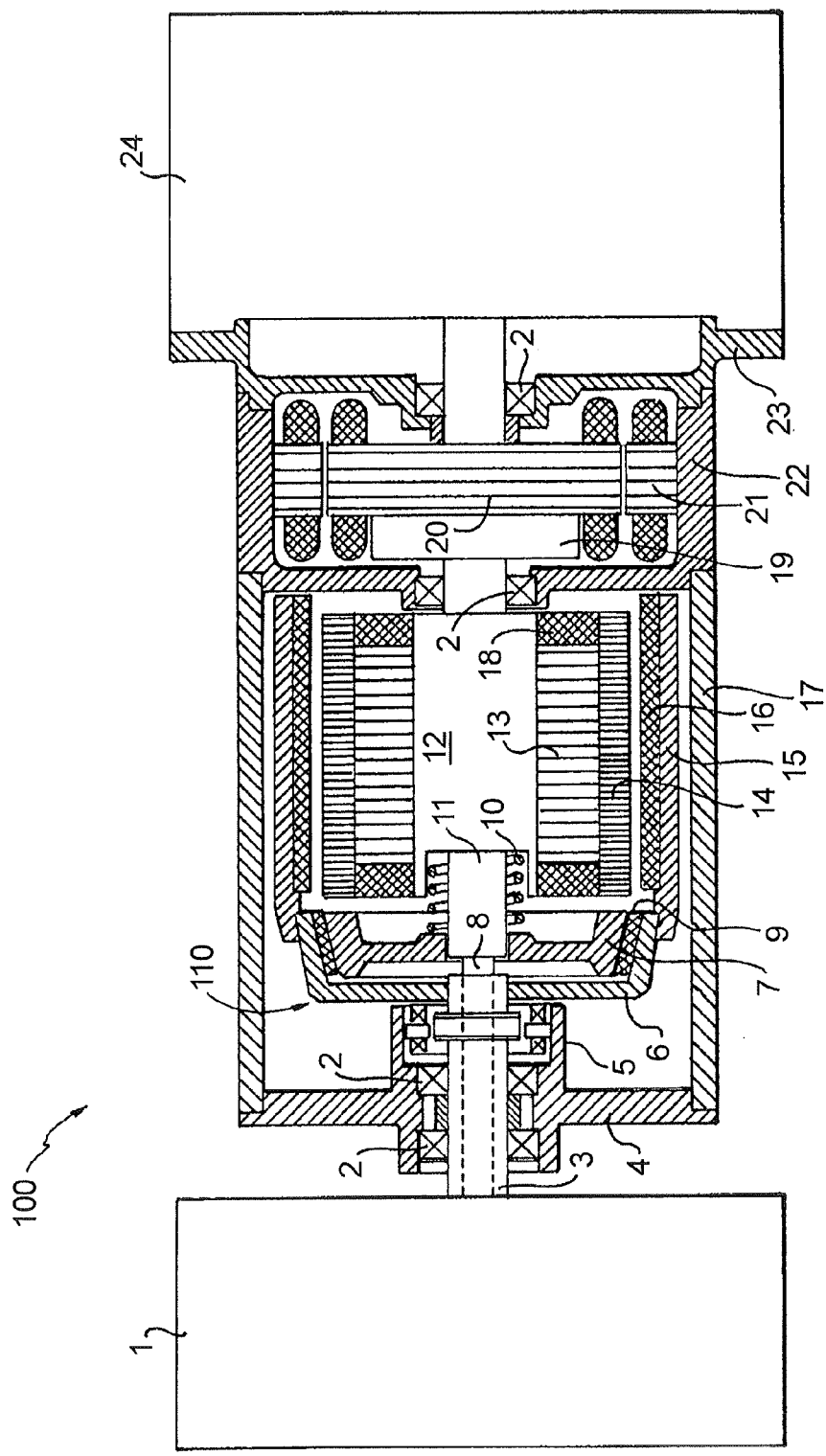
FIG. 1 is a schematic cross-sectional side elevation view of an exemplary embodiment of an integrated electromagnetic clutch and eddy-current coupling constructed in accordance with the present invention, showing the clutch members engaged in a first position for common rotation.

Reference will now be made to the drawings wherein like reference numerals identify similar structural features or aspects of the subject invention. For purposes of explanation and illustration, and not limitation, a partial view of an exemplary embodiment of an integrated electromagnetic clutch and eddy-current coupling system in accordance with the disclosure shown in FIG. 1 and is designated generally by reference character 100. Other embodiments of systems in accordance with the invention, or aspects thereof, are provided in FIGS. 2-4, as will be described. The systems and methods of the invention can be used, for example, in all types of land vehicles including vehicles with combustion engines, hybrid electric vehicles (HEV) and electric vehicles (EV).

Referring to FIG. 1, system 100 generally includes two parts, namely electromagnetic friction clutch 110 and eddy-current coupling 12 for transmission of power from a driving member, e.g., engine or electric motor assembly 24, and a driven member 1, e.g., a mechanical transmission, wheel or the like. The speed of the driven shaft, i.e., output shaft 3, can be the same as the speed of the driving shaft, i.e., input shaft 1, when friction clutch 110 is engaged, but can also be controlled by eddy-current coupling 12 when friction clutch 110 is disengaged. In comparison with traditional systems, this arrangement can provide the potential benefits of extended electromagnetic torque and speed control, prevention of engine stopping when the traction resistance is too high, and replacement of a mechanical transmission in some applications.

With continued reference to FIG. 1, electromagnetic clutch 110 of system 100 includes a driven clutch member, namely cup 6, and a driving clutch member, cone 7. Cup 6 is connected for common rotation with output shaft 3, and cone 7 is connected for common rotation with input shaft 11. Cup 6 includes a frictional clutch pad 9 and cone 7 can be moved axially back and forth by the eddy-current coupler 110 to engage and disengage the mechanical transmission shaft, or direct drive wheel shaft. Cup 6 and cone 7 of the clutch are operatively connected to one another for common rotation in a first position frictionally engaged to one another as shown in FIG. 1, and for rotation relative to one another in a second position disengaged from one another as shown in FIG. 2.

A synchronous generator, including field excitation system 21 and armature 20, is contained in a housing 22 connected rigidly to the combustion engine or electric motor assembly 24 via a mounting flange 23. Cone 7 of the clutch assembly and the eddy-current coupler 12 are housed in main housing 17, which is connected to housing 22 on one end and to the front end bell 4 on the other. This provides sufficient structural rigidity to support the hollow output shaft 3, its bearings 2, the tachogenerator 5, and the shaft end 8 of input shaft 11, which is coaxially located inside the hollow of output shaft 3. Tachogenerator 5 provides feedback, for example speed feedback, to the control unit of system 100.

Figure 2:
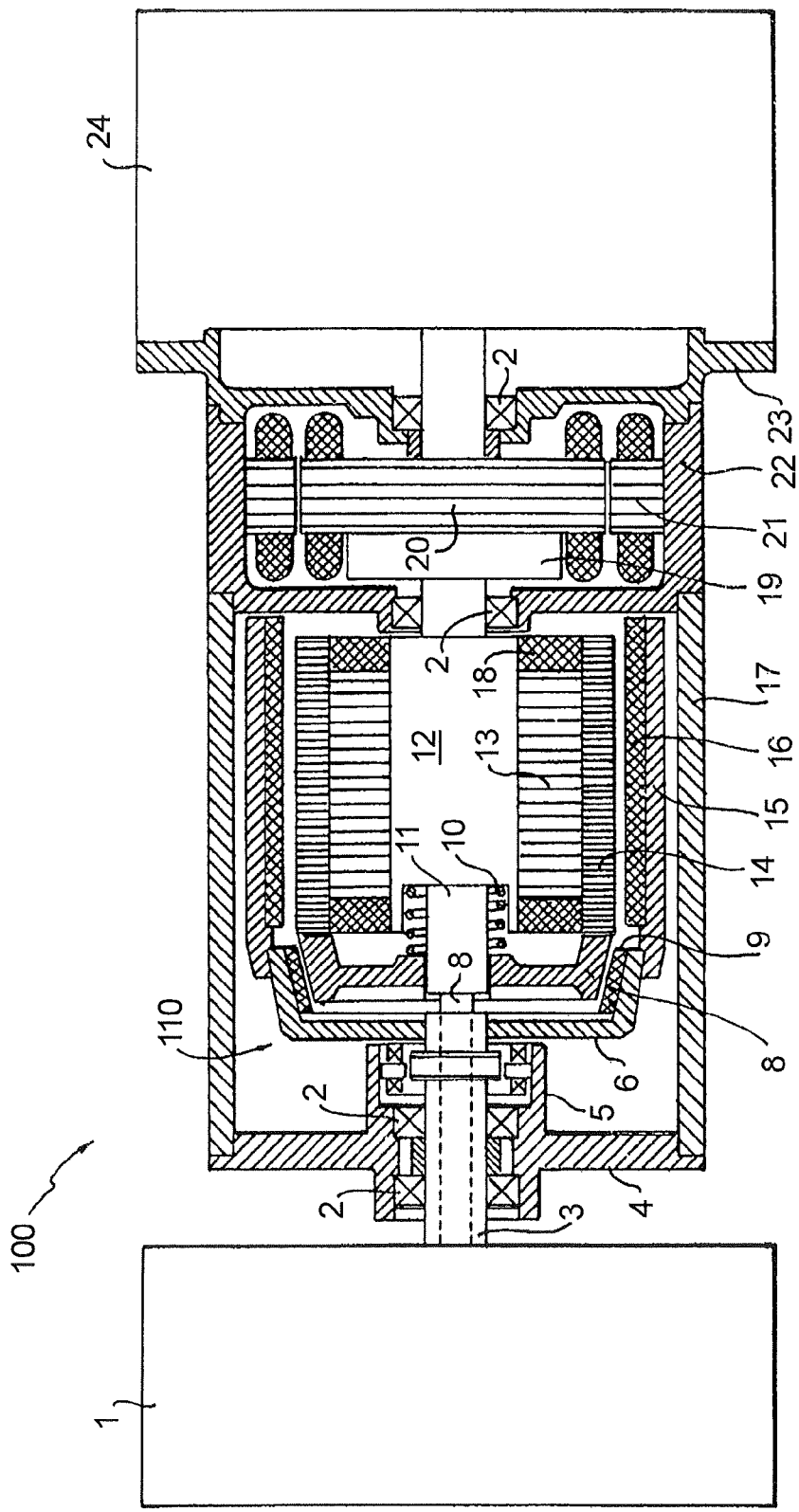
FIG. 2 is a schematic cross-sectional side elevation view of the integrated electromagnetic clutch and eddy-current coupling of FIG. 1, showing the clutch members in a second position disengaged for relative rotation.

With continued reference to FIGS. 1 and 2, eddy-current coupling 12 is operatively connected as an electromagnetic actuator to selectively move cone 7 of the clutch between the first and second positions described above. The electromagnetic actuator includes the synchronous generator operatively connected to selectively generate an electromagnetic field to move clutch cone 7 into the second position, disengaged from clutch cup 6. Control excitation current feeds the stationary DC winding 21 of the synchronous generator. A rotating armature 20 is connected for common rotation with input shaft 11. Rotating armature 20 can be a three-phase armature or any other suitable type of armature, and is part of the synchronous generator. Field coil 18 is also operatively connected for common rotation with input shaft 11. Rotating armature 20 delivers the excitation current to field coil 18 of the eddy-current coupling 12 via the rotating diode rectifier 19. The pole shoe 14 of the eddy-current coupling exciter attracts cone 7 of the friction clutch, decoupling cone 7 from cup 6, placing the friction clutch into the second position as shown in FIG. 2. The result is a small gap between pad 9 and cone 7.

If the DC field excitation current in the field winding 21 is zero, the current in the field coil 18 is also zero. In this condition, no eddy-currents are induced in drum 15. There are not enough eddy currents induced by the magnetic field on clutch cone 7, so under the force of clutch spring 10, clutch cone 7 is biased into its first position. This mechanically couples input shaft 11 of the combustion engine or electric motor assembly 24 with the output shaft 3 for common rotation. Output shaft 3 and input shaft 11 of the eddy-current coupling 12 and combustion engine or electric motor assembly 24 are supported by spaced apart bearings 2 of main housing 17.

Power is still transferred from input shaft 11 to output shaft 3 even when clutch cone 7 is disengaged from clutch cup 6. Eddy-current coupling 12 is operatively connected to provide electromagnetic eddy-current coupling between the clutch cup 6 and cone 7 with the clutch members in the second position disengaged from one another. This allows for eddy-current coupling 12 to couple directly to the driven output shaft 3 with the aid of eddy-currents, i.e., the interaction of the magnetic field of pole shoes 14 on eddy-currents induced in the rotating drum 15. Rotating drum 15 is mechanically joined for common rotation with output shaft 3, which is supported by bearing 2. Drum 15 is radially spaced apart outward from pole shoes 14, and includes an electric circuit 16 that is mounted within the drum, wherein the electric circuit 16 of drum 15 and pole shoe 14 with the field coil 18 are operatively connected for eddy-current coupling therebetween. In short, the same electromagnetic field that pulls clutch cone 7 out of engagement also provides eddy-current coupling between drum 15 and pole shoes 14.

When driven by eddy-current coupling 12, the speed of the shaft 3 can be lower than the speed of the combustion engine or electric motor assembly 24 because there is a slip, s, between drum 15 and the pole shoes 14. The slip, s, can be controlled by the excitation current in the stationary field winding 21 of the synchronous generator. The following relationship exists between the speed $v_p$ of the driven shaft 3, and the speed $v_e$ of the combustion engine or electric motor assembly 24:

$$v_p = (1-s)v_e$$

The higher the slip, s, the lower the speed of output shaft 3, $v_p$, for a fixed input speed of the engine/motor, $v_e$. When needed, the speed of the input shaft 11 can be kept near its optimal range, while the driven output shaft 3 speed is decreased with the aid of the eddy-current coupling.

Figure 3:
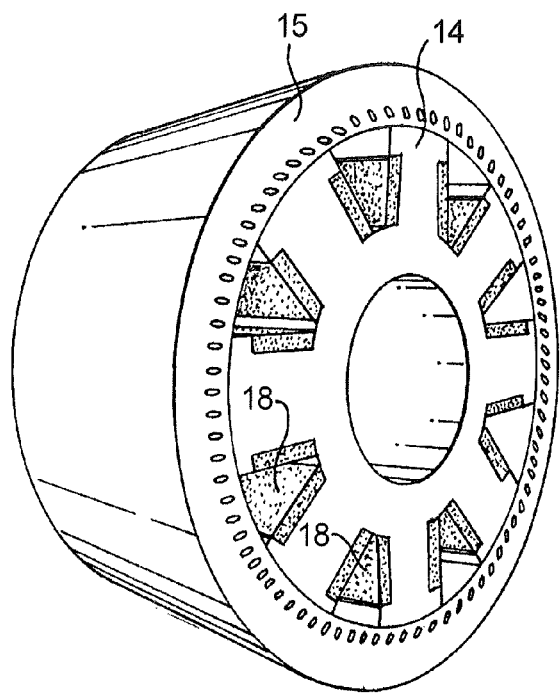
FIG. 3 is a schematic cross-sectional perspective view of a portion of the integrated electromagnetic clutch and eddy-current coupling of FIG. 1, showing the pole core and pole shoes of the eddy-current coupling.

The rotating drum 15 can be of a cage type, as in a rotor cage winding of an induction motor, and can be made of aluminum, or solid steel coated on its inner cylindrical surface with copper. Those skilled in the art will readily appreciate that any other suitable materials can be used without departing from the scope of this disclosure. FIG. 3 schematically shows drum 15 surrounding pole shoe 14, pole core 13, and field coil 18.

Figure 4:
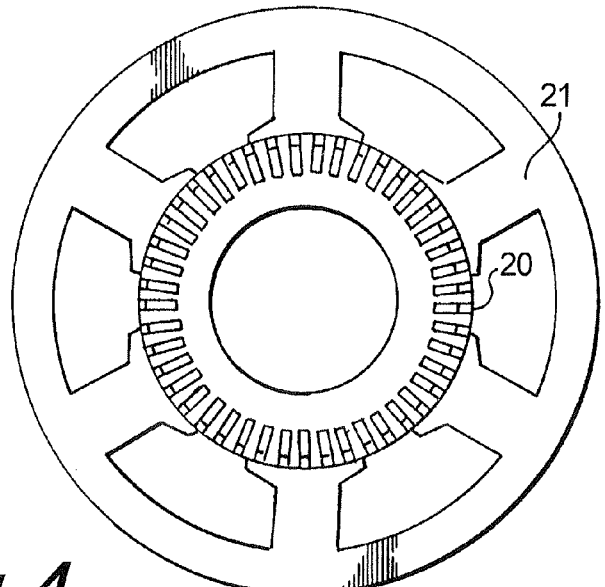
FIG. 4 is a schematic cross-sectional end elevation view of a portion of the integrated electromagnetic clutch and eddy-current coupling of FIG. 1, showing rotating armature and field excitation system of the synchronous generator.

Referring now to FIG. 4, the synchronous generator is of reversed construction: it has stationary DC field excitation system 21 and rotating 3-phase armature winding, namely armature 20. The AC armature current is rectified with the aid of rotating diode pack, namely rotating rectifier 19 shown in FIGS. 1 and 2, and feeds the field excitation coils 18 of the eddy-current coupling 12 as described above. When the excitation current is greater than zero, the rotating rectifier 19 provides current to the eddy-current exciter which in turn pulls cone 7 of the clutch to provide eddy-current engagement with the output shaft 3 through the slip, s. This condition ensures the driven shaft speed, $v_p$ is less than the combustion engine shaft speed, $v_e$. Conversely, when no excitation current is provided, cone 7 of the clutch returns to its normal position under the bias of cone spring 10, thus coupling mechanically the driven shaft 3. Under these conditions, $v_e = v_p$.

Integrated electromagnetic clutch and eddy-current coupling systems for electric speed and torque control can offer the following potential benefits: extended torque control, electromagnetic clutch with constant or controlled speed, improved overload capability, fuel saving, and is of benefit in the trend toward the more electric land vehicle. These systems can be used as electromagnetic differential mechanisms, and can even eliminate the need for mechanical transmissions in some applications.

The methods and systems of the present invention, as described above and shown in the drawings, provide for transmission of mechanical with superior properties including flexibility in transmission of power, for example to allow flexibility as needed to adapt to changing traction conditions. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A system for transmission of power from a driving member to a driven member comprising:
   an electromagnetic clutch including a driving clutch member configured and adapted to rotate in common with an input shaft, and a driven clutch member configured and adapted to rotate in common with an output shaft, wherein the driving clutch member is operatively connected to an electromagnetic actuator for movement between a first position in which the driving clutch member and the driven clutch member are engaged for common rotation and a second position in which the driving clutch member and the driven clutch member are disengaged from one another for relative rotation; and
   an eddy-current coupling operatively connected to drive the driven clutch member at a rate different from that of the driving clutch member with the driving clutch member in the second position, wherein the electromagnetic actuator includes a synchronous generator operatively connected to selectively generate an electromagnetic field to move the driving clutch member into the second position, disengaged from the driven clutch member.

2. A system as recited in claim 1, further comprising an input shaft, wherein the driving clutch member and a rotating armature of the synchronous generator are operatively connected for common rotation with the input shaft.

3. A system as recited in claim 2, further comprising a field coil operatively connected for rotation in common with the input shaft, wherein the synchronous generator includes a stationary DC winding configured and adapted to remain stationary relative to the rotating armature of the synchronous generator, and to deliver field excitation current to the field coil through the rotating armature to generate a magnetic field from the field coil to move the driving clutch member into the second position, disengaged from the driven clutch member.

4. A system as recited in claim 3, further comprising a rotating rectifier operatively connected to the rotating armature for delivering DC field excitation from the rotating armature to the field coil.

5. A system as recited in claim 1, further comprising a clutch spring operatively connected to bias the driving clutch member toward the first position engaged with the driven clutch member.

6. A system for transmission of power from a driving member to a driven member comprising:
   an electromagnetic clutch including a driving clutch member configured and adapted to rotate in common with an input shaft, and a driven clutch member configured and adapted to rotate in common with an output shaft, wherein the driving clutch member is operatively connected to an electromagnetic actuator for movement between a first position in which the driving clutch member and the driven clutch member are engaged for common rotation and a second position in which the driving clutch member and the driven clutch member are disengaged from one another for relative rotation;
   an eddy-current coupling operatively connected to drive the driven clutch member at a rate different from that of the driving clutch member with the driving clutch member in the second position; and
   a drum mounted to the driven clutch member for common rotation with the output shaft, wherein the drum is radially spaced apart outward from a field coil operatively connected for common rotation with the input shaft.

7. A system as recited in claim 6, further comprising an electric circuit mounted within the drum, wherein the electric circuit of the drum and the field coil are operatively connected for eddy-current coupling therebetween.

8. A system comprising:
   a housing including spaced apart bearings supporting an input shaft and a separate output shaft, wherein the input shaft is configured and adapted to be connected to a motor or engine for mechanical power input, and wherein the output shaft is configured and adapted to be connected to deliver mechanical rotational power output;
   a driving clutch member operatively connected for common rotation with the output shaft;
   a driven clutch member operatively connected for common rotation with the input shaft, wherein the driving clutch member is biased towards a first position engaged with the driven clutch member for common rotation of the input and output shafts;
   an eddy-current coupling operatively connecting the driving clutch member to the driven clutch member for driving the output shaft at a different rate from the input shaft with the driving clutch member in a second position spaced apart from the driven clutch member; and
   an electromagnetic actuator that includes a synchronous generator operatively connected to selectively generate an electromagnetic field to move the driving clutch member into the second position, disengaged from the driven clutch member.

9. A system as recited in claim 8, wherein the driving clutch member and a rotating armature of the synchronous generator are operatively connected for common rotation with the input shaft.

10. A system as recited in claim 9, further comprising a field coil operatively connected for rotation in common with the input shaft, wherein the synchronous generator includes a stationary DC winding configured and adapted to remain stationary relative to the rotating armature of the synchronous generator, and to deliver field excitation current to the field coil through the rotating armature to generate a magnetic field from the field coil to move the driving clutch member into the second position, disengaged from the driven clutch member.

11. A system as recited in claim 10, further comprising a rotating rectifier operatively connected to the rotating armature for delivering DC field excitation from the rotating armature to the field coil.

12. A system as recited in claim 8, further comprising a clutch spring operatively connected to bias the driving clutch member toward the first position engaged with the driven clutch member.

13. A system comprising:

a housing including spaced apart bearings supporting an input shaft and a separate output shaft, wherein the input shaft is configured and adapted to be connected to a motor or engine for mechanical power input, and wherein the output shaft is configured and adapted to be connected to deliver mechanical rotational power output;

a driving clutch member operatively connected for common rotation with the output shaft;

a driven clutch member operatively connected for common rotation with the input shaft, wherein the driving clutch member is biased towards a first position engaged with the driven clutch member for common rotation of the input and output shafts;

an eddy-current coupling operatively connecting the driving clutch member to the driven clutch member for driving the output shaft at a different rate from the input shaft with the driving clutch member in a second position spaced apart from the driven clutch member; and a drum mounted to the driven clutch member for common rotation with the output shaft, wherein the drum is radially spaced apart outward from a field coil operatively connected for common rotation with the input shaft.

14. A system as recited in claim 13, further comprising an electric circuit mounted within the drum, wherein the electric circuit of the drum and the field coil are operatively connected for eddy-current coupling therebetween.

* * * * *